(12) United States Patent
Zhang et al.

(10) Patent No.: US 9,009,464 B2
(45) Date of Patent: Apr. 14, 2015

(54) ANONYMOUS REGISTER SYSTEM AND METHOD THEREOF

(75) Inventors: Zhihui Zhang, Beijing (CN); Mingshu Hu, Shenzhen (CN)

(73) Assignee: Sony Corporation, Tokyo (JP)

( * ) Notice: Subject to any disclaimer, the term of this patent is extended or adjusted under 35 U.S.C. 154(b) by 973 days.

(21) Appl. No.: 12/760,907

(22) Filed: Apr. 15, 2010

(65) Prior Publication Data

US 2010/0275015 A1   Oct. 28, 2010

(30) Foreign Application Priority Data

Apr. 22, 2009 (CN) .......................... 2009 1 0135605

(51) Int. Cl.
*H04L 29/06* (2006.01)
*H04L 9/32* (2006.01)
*G06F 21/00* (2013.01)
*H04L 9/08* (2006.01)

(52) U.S. Cl.
CPC ................ *H04L 9/3268* (2013.01); *H04L 9/08* (2013.01); *H04L 9/0833* (2013.01); *H04L 63/0421* (2013.01); *H04L 63/065* (2013.01); *H04L 63/0823* (2013.01); *H04L 2209/42* (2013.01)

(58) Field of Classification Search
CPC ......... H04L 9/006; H04L 9/08; H04L 9/0816; H04L 9/0825; H04L 9/0833
USPC .......... 713/155, 156, 158, 182, 180; 726/6, 7; 380/286
See application file for complete search history.

(56) References Cited

U.S. PATENT DOCUMENTS

| | | | |
|---|---|---|---|
| 2002/0029337 A1* | 3/2002 | Sudia et al. .................... | 713/176 |
| 2002/0099668 A1* | 7/2002 | Perlman .......................... | 705/76 |
| 2003/0177352 A1 | 9/2003 | Camenisch et al. | |
| 2004/0243827 A1* | 12/2004 | Aguilera et al. .............. | 713/200 |
| 2008/0091941 A1* | 4/2008 | Yonezawa et al. ............ | 713/158 |
| 2008/0172559 A1 | 7/2008 | Yellepeddy | |

* cited by examiner

*Primary Examiner* — Ashok Patel
*Assistant Examiner* — Daniel Potratz
(74) *Attorney, Agent, or Firm* — Oblon, McClelland, Maier & Neustadt, L.L.P.

(57) ABSTRACT

A uniform certificate revocation list managing apparatus is provided for managing canceled register information of all believable groups in a believable anonymous register system. Canceled register information includes canceled member information of each believable group, list information of unbelievable groups, and list information of unbelievable register service institutions. The uniform certificate revocation list managing apparatus interacts with each believable group and each register system, so as to update a certificate revocation list of each believable group in real time.

11 Claims, 9 Drawing Sheets

ANONYMOUS REGISTER SYSTEM AND METHOD THEREOF

FIELD OF THE INVENTION

The present invention relates to a controlled anonymous system for a secured communication of data transfer, and more particularly, relates to constructing a believable anonymous platform using cipher techniques, so as to both protect the privacy information of a user, and to not affect the user to participate in related fields such as electronic trademark, on-line network and the like.

DESCRIPTION OF THE RELATED ART

The protect of user privacy has always be one of the most challenging projects during the development of network technologies, and with the development of public key cryptology, the propose and application of various signature schemes, and especially the development of group signature technology, the controlled anonymous technology is implemented and put into application.

The concept of group signature is first proposed by D. Chaum and E. Heyst [1] in 1991. With a group signature scheme, a group member can sign anonymously in representative of the whole group. The group signature can be applied in the case that any member in a large corporation can sign a piece of file in representative of the corporation. Different from a normal signature scheme, during authentication, an authentication side, through a grasp of the public key information, can only confirm that the signature was made by some member of the corporation, but can not determine the precise identity of the signer, so that the organization structure of the corporation and member privacy information are protected. A group signature scheme must possess the attributes of unforgeablity, anonymity, uncorrelation, anti-trap ability, the ability of being tracked, and the ability of anti joint attack. Of course, efficiency also should be considered as an important factor.

Current register systems for users, either on-line or off line, are based on a true identity of a user or an open registration, and at most requires the input of a verify code for the purpose of filtering malicious users. For an open registration, a user can forge identities (such as email address) arbitrarily and get a register account, and perform various on-line or off-line operations. And for a registration based on a true identity, privacy information such as identity code, mobile numbers are often required, and an applying environment with a higher requirements for believable degree, checks more strictly on a true identity. However with the development of network technology, users demand more on the privacy protect for privacy information of their own. Thus, how to guarantee privacy of a user and at the same time to let a register service institution can believe an anonymous register user is always a dilemma problem.

Currently, group signature based anonymous systems focus on a group signature algorithm itself and a single anonymous system, and do not consider the correlation between different anonymous systems. And a user identity based register is subjected to the risk of exposing user privacy information.

There exist several severe drawbacks in the existing schemes:

There does not exist a uniform believable platform enabling secured interaction between various believable groups and a register service institution.

A user register institution requires the providing of privacy information by a user to implement a believable mechanism, but such believable mechanism is on the basis of the exposure of privacy information by a user.

There does not exist an efficient means to evaluate a believable degree of an anonymous user and an anonymous group.

The present invention is proposed in view of such circumstance, aiming at a believable anonymous register system and method, which can both secure user privacy information, and support an anonymous identity with various participants of the system under a believable environment

SUMMARY OF THE INVENTION

To achieve the above objects, the present invention is proposed.

One aspect of the present invention provides a uniform certificate revocation list managing apparatus, for managing canceled register information of all believable groups in a believable anonymous register system, the canceled register information comprising canceled member information of each believable group, list information of unbelievable groups, and list information of unbelievable register service institutions, wherein, the uniform certificate revocation list managing apparatus interacts with each believable group and each register service institution in the believable anonymous register system, so as to update a certificate revocation list of each believable group in real time.

The uniform certificate revocation list managing apparatus according to the present invention can comprise: an access control unit as an input/output interface with other apparatuses in the believable anonymous register system; a UCRL identity certificate storing unit for storing an identity certificate of the UCRL; an identity authentication unit, for when interacting with the believable group module and said register service institution, performing identity authentication of each other based on the identity certificate of the UCRL stored in the UCRL identity certificate storing unit; a CRL list storing unit, for storing a CRL list of each believable group, a list of unbelievable groups, a list of unbelievable register service institutions; a CRL list access processing unit, for processing, via the access control unit, an access to the CRL list storing unit from the register service institution, so as to access a CRL list information in the CRL list storing unit; and a cipher operation unit, for on a basis of an instruction of the identity authentication unit and the access control unit, by use of a cryptography, performing encryption/decryption, signature, and signature authentication, and computing an integrity of message transmitted from a user entity, the believable group module or the register service institution.

The uniform certificate revocation list managing module can further comprise: a CRL list update processing unit, for in response to a request to update CRL list information update from a UCRL interact processing unit in the believable module, performing update process with respect to the CRL list storing unit, so as to update the CRL list of a believable group stored in the CRL list storing unit, or for updating the CRL list information of a believable group when the believable group takes initiative to interact with the uniform canceled list managing module.

The uniform certificate revocation list managing module can further comprise: an abnormality data storing unit for storing abnormal information uploaded by a believable group or a register service institution; a believable degree evaluation unit, for evaluating a believable degree of the believable group or the register service institution based on the abnormal information, and for updating the list information of unbelievable groups in the CRL list storing unit according to the evaluated believable degree.

Another aspect of the present invention provides A register service institution, for supporting a user to input personal information in a register system to perform register, and also for supporting a user to perform anonymous register in the register system in a role of a member in a believable group without providing any personal privacy information, wherein, the register service institution interacts with a uniform canceled resister list managing apparatus and each believable group in the register system, so that if a user, after possessing a registered identity, performs an illegal or unreasonable operation, it notifies in real time the uniform certificate revocation list managing apparatus to update a certificate revocation list of each believable group.

The register service institution as claimed can comprise: an access control unit as an input/output interface with other modules; a register service institution identity certificate storing unit for storing an identity certificate of the register service institution; an anonymous user register processing unit, for processing various background processes of anonymous register of a user; an anonymous identity authentication unit, for performing authentication of an anonymous identity of a user, in response to a selection of anonymous register by the user; a UCRL interaction processing unit, for interacting with a UCRL, and for requesting the UCRL to confirm whether an applicant of anonymous register is in a certificate revocation list of the UCRL, in response to a selection of anonymous register by the user; a believable group interaction processing unit, for applying to a believable group for withdrawing a register right of an applicant of anonymous register, or withdrawing an anonymity of a user; a registered member account processing unit, for generating account information for all registered users; an anonymous account information storing unit, for storing an account of an anonymous user generated by the registered member account processing unit and other related information; and a cipher operation unit, for on a basis of an instruction of the anonymous user register processing unit, the anonymous identity authentication unit, and the registered member account processing unit, by use of a cryptography, performing encryption/decryption, signature, and signature authentication, and computing an integrity of message transmitted from a user entity, a uniform certificate revocation list module, or the believable group module.

The register service institution can further comprise: a local abnormality record storing unit, for buffering a register application for which an anonymous register fails and corresponding interaction information record and account which is cancelled by the register service institution due to improper action, wherein, the UCRL interaction processing unit also can update information stored in the local abnormality record storing unit to the UCRL.

The register service institution can further comprise: a non-anonymous user register processing unit, being used for related processing while performing non-anonymous register of a user; a non-anonymous identity authentication unit, for identity authentication of a non-anonymous user; and a non-anonymous account information storing unit, for storing an account of a non-anonymous user generated by the registered member account processing unit and other related information.

The cipher operation unit can support various cryptography as needed, including Hash, symmetric cryptography, and public key cryptography The authentication performed by the anonymous identity authentication unit can comprise authentication of believable degree of a group to which a user belongs and authentication of group signature information provided by a user.

Another aspect of the present invention provides A believable anonymous register system, comprising: a believable group module, with each believable group module constituting a believable environment; a uniform certificate revocation list managing module, for uniformly managing all certificate revocation list information; a register service institution, for performing register process; a user entity, for a user to perform an anonymous register, and which supports a user side security module of an signature algorithm required by an believable group; wherein, the uniform certificate revocation list managing apparatus interacts with each believable group and each register service institution in the believable anonymous register system, so as to update a certificate revocation list of each believable group in real time.

The register service institution can be constructed of a multiple of register service institutions for different application environments.

The each believable group module and each register service institution can assure identity reliability by respective identity certificate and corresponding signature algorithm.

The each believable group module can comprise: an access control unit as an input/output interface with other modules; a believable group management control unit, for scheduling and processing operations related to a member of a believable group; a believable group identity certificate storing unit, for storing an identity certificate of the believable group; an identity authentication unit, for when interacting with the uniform certificate revocation list module and each register service institution, performing identity authentication of each other based on the identity certificate of the believable group itself stored in the believable group identity certificate storing unit; a believable group element generating/member authentication unit, for generating an element of a believable group, and for when an identity of a certain member of a believable group is questioned by the register service institution or uniform certificate revocation list managing module, performing identity authentication of the questioned member of the believable group; a believable group member identity information storing unit, for storing identity information of all members joined into the believable group; and a cipher operation unit, for on a basis of an instruction of the identity authentication unit, believable group management control unit, or believable group element generating/member authentication unit, by use of a cryptography, performing encryption/decryption, signature, and signature authentication, and computing an integrity of message transmitted from a user entity, the uniform certificate revocation list module or the register service institution.

The each believable group module can further comprise: a believable group member update unit, for on a basis of a processing result of cancellation of a member of a believable group, upgrade of a member key etc performed by the believable group management control unit, performing update operation for identity information of members of the believable group stored in the believable group member identity information storing unit.

The each believable group can further comprise a local CRL list information unit, for storing identity information of a canceled member of the believable group, wherein, the believable group member update unit updates the identity information of the canceled member of the believable group in the local CRL list information unit according to the processing result of cancellation of the member of the believable group.

The each believable group can further comprise a UCRL interaction processing unit, for, after the local CRL list information in the local CRL list information unit was updated, interacting with the UCRL through the access control unit, so as to update CRL information for the believable group in the UCRL in real time.

Each user entity can comprise: an access control unit as an input/output interface with other modules; an identity authentication unit, for the user entity to perform authentication of identity information of a believable group or an applied register service institution, so as to confirm the believableness and validity of the identity; a user entity group member function managing unit, for processing operations related to a believable group, comprising operations of applying for joining a group, requesting for obtaining a member identify and storing a member key, and updating a member key; a user entity register information managing unit, for processing operations related to an applied register service institution when applying for one or more anonymous register identities and updating of register information; a security module, comprising two parts of security storing unit and cipher operation unit, said security storing unit is a physical storage area being prevented from being tampered, and for storing secrecy data including group member key, said secrecy data being operated based on specific update logic and access control, and said cipher operation unit supports basic operations such as Hash, symmetric encryption/decryption, and asymmetric encryption/decryption, and also supports specific signature/authentication algorithm; a group member key updating/group signature processing unit, for when a user needs to join one or more believable groups, calling data and algorithm of said security module, and performing signature operation with respect to challenging information sent from the register service institution by use of member key of the user; a user register information storing unit, for storing information related to an applied register service institution with which the user registered; a user register information update/access unit, for interacting with the user register information storing unit and the user entity register information managing unit, to implement the function of storing and accessing.

The each believable group and each register service institution can assure identity reliability by an identity certificate and corresponding signature algorithm.

Another aspect of the present invention provides an anonymous register method, comprising: a user entity joins a believable group to obtain a member certificate; a user registers with a register service institution and requests to perform anonymous register; the register service institution and a UCRL, in response to said anonymous register request, authenticate the reliability of a believable group to which the user belongs and the reliability of the user, and if the authentication succeeds, the register service institution generates and stores a member account for the user, and handles corresponding register transaction, and if the authentication fails, the register service institution abandons operations of this time and records corresponding information into an abnormality record storing unit, and at the same time uploads the same to an abnormality database of the UCRL.

The step of authenticating the reliability of a believable group to which the user belongs and the reliability of the user can comprise: the register service institution generates by its cipher operation module a random number of a certain length, and transfers it to the user entity side; the user entity side implements a signature operations with respect to the received random number by use of its member certificate and corresponding algorithm, and transfers the operation result back to the register service institution, and the register service institution verifies the received result which was transferred back by use of public information of corresponding believable group.

The anonymous register method can further comprise: each believable group updates CRL of its own continually, and transfers the updated CRL information to the uniform certificate revocation list managing module UCRL, the updating step comprising the steps of: encoding the updated local CRL list information, and computer abstract value of integrity; performing signature to the abstract value of integrity by use of the identity certificate of the believable group; the UCRL, after receiving the CRL updated information sent from the believable group, authenticates the signature, and updates stored content related to the information of the UCRL.

The step that a user entity joins to a believable group to obtain a member certificate can comprise the steps of: the user provides personal information according to requirements of the believable group; the believable group, after authenticating the validity of the information of the applicant, implements the generation of the member certificate by an administer, the certificate comprising member key and being transferred to the applicant by a secure way.

The anonymous register method can further comprise: if a user, after possessing a registered identity, performs an illegal or unreasonable operation, the register service institution interacts with the believable group to which the user belongs, to disclose the true identity of the user and cancel the identify of the user, and place the user into the CRL, said step comprising: the register service inquiries its anonymous account information storing unit to find the corresponding account of the user and information of the believable group to which the user belongs; send a response information provided when the user performs anonymous register to the believable group; disclose the true identity of the user under operation of an administrator of the believable group; the believable group updates information of group members, and place the user into the local CRL; the believable group uploads the new CRL information to the UCRL; and after the UCRL confirms the validity of the data, the UCRL updates the database.

The step that the UCRL confirms the validity of the data can comprise: on a basis of abnormal record information provided by corresponding believable group and register service institution, the UCRL authenticates the believable degree of the corresponding believable group and register service institution by its cipher operation unit and identity authentication unit, so as to determine whether each believable group and each register service institution is believable.

In general, the present invention provide a believable anonymous register system and method, the system comprising some believable groups, some register service institutions supporting anonymous register, and a uniform certificate revocation list UCRL. Under a PKI scheme, a believable relationship is built relying on CA, that is, each individual owns a certificate of its own, the certificate being issued directly by a Root CA, and is for guaranteeing the believable relationship between each other when the three parties of a believable group, a register service institution and a UCRL are interacting.

The advantages of the present invention lie in: a uniform believable platform is built by the UCRL, to coordinate different believable groups and different applied register service institution. A user can anonymously register to a register service institution as the identity of a group member, and the register service institution can only authenticate whether the user belongs to the believable group, but can not obtain the privacy information of the user. A believable degree is computed based on abnormality record through the believable degree evaluation function in the UCRL, so as to adjust the believable relationship of various believable groups and register service institutions. And a user, through registering himself in a believable group once, simplifies the later register operations, and do not need to repeatedly input personal materials concerning privacy and security sensitivity.

DESCRIPTION OF PREFERRED EMBODIMENTS

To better clarify the object, technical solution and advantages of the present invention, detailed descriptions will be given on the embodiments of the present invention in conjunction with drawings.

Figure 1:
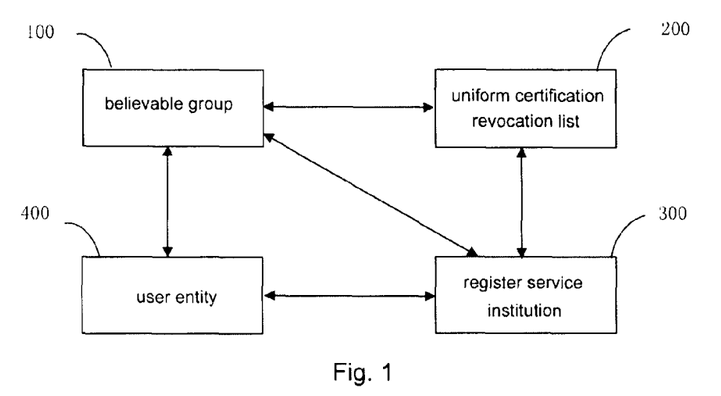
FIG. 1 is a diagram showing a structure of a believable anonymous register system to which the present invention is applied.

Referring to FIG. 1, which is a diagram shows a structure of a believable anonymous register system applied, the system includes four parts: a believable group 100, a uniform certificate revocation list 200, register service institution 300 and a user entity 400.

When a user applies for joining the believable group 100 (which can be a corporation, an entity, or other organization institutions), an administrator of the believable group 100 checks the apply, and if the check passed, adopts a cipher technique (such as group signature technique) to generate a user key for the user.

Then the user with the valid user key can perform an anonymous register on the register service institution 300 which provides an anonymous service. The register service institution 300 checks an anonymous apply of a user. The check is implemented based on a group signature based authentication technique.

In checking a user apply, the register service institution needs to interact with the UCRL 200, to verify the validity of a user identity and the validity of a believable group to which the user belongs.

During providing service for a registered user from a register service institution, if the registered user performs an illegal operation, the register service institution will request the believable group to disclose the true identity of the user based on a detection result of the illegal operation, and inform it to the UCRL 200. Meanwhile, when the believable group 100 is receiving a member apply from a user, for the user information for which the apply fails, the believable group 100 is required to upload it to the UCRL.

To put it in a common way, in an anonymous register system according to an embodiment of the present invention, if a user wants to register anonymously into a register service institution 300, then in the first step, the user needs to join a believable group successfully, to obtain a member identity and a member key. In the second step, the user selects on line to register anonymously to the register service institution 300, and the register service institution 300 and the user entity 400 establish a believable relationship their between through a challenge-response scheme. The details can be: the register service institution 300 generates a challenge vector, that is a random number, by a cipher operation module; the user entity performs signature operations on the random number based on the member key by a security module of its own, and submits it to the register service institution 300 as a response vector; the register service institution 300 verifies the validity of the anonymous identity of the user through the believable group 100 and UCRL 200, and if the anonymous is valid, then an anonymous account is established for the user, else, this is recorded in the local CRL 108, and related information is uploaded to the UCRL 200.

The believable group 100 is responsible for managing the user 400, and enables the user to establish a key for performing signature operations in representative of a whole group. Further, an administrator in the believable group 100 can ultimately determine a signature provided from a register service institution corresponds to which group member, and except the administrator, other group members can not forge a signature of others, which is implemented based on the security feature of the group signature.

The register service institution 300 supports to acknowledge a legal identity of a user through an authentication based on a group signature, and to establish an anonymous account for the user based on such believable relationship. Once the anonymous account is involved in some disputes in later operations, the true identity of the user can be finally determined through the administrator of the believable group, so that it is ensured that an anonymous user can be tracked. The register service institution 300 will upload information related to a fail registration and data related to a dispute to the UCRL 200. The UCRL can evaluate the believable degree of the group to which the user belongs to by some technical means from the data source being kept on being accumulated.

UCRL 200 is a center institution which coordinates believable relationship. The UCRL records the CRL information of each believable group 100, a list of unbelievable groups, and a list of unbelievable register institutions, and is responsible for evaluating the believable degree of its associated believable groups and register service institutions. Each believable group needs to update voluntarily the modified information of local CRL to the UCRL timely. The UCRL 200 will also store the abnormal record information submitted by the believable group 100 and the register service institution 300, and use the abnormal information as samples, obtain the believable degree of each believable group and each register institution by an evaluation system of scientific computation, determine believable relationship accordingly, and establish a database with the information on the determined unbelievable groups and untreated service institutions, stores the database, and output such information.

The present invention can apply to current network platforms, for example, a corporation serves as a believable group, and when a new employee joins, an administrator creates a member key for the new employee. When the user wants to perform an anonymous register with an application web, he or she only need to perform authentication operation with the member key distributed by the corporation, and the application web can authenticate that the user is from the corporation (note, it is only authenticated that the user is one member of the corporation, and it can not be known that which member the user is), thus if the web believes the corporation (confirm a believable degree through the UCRL platform), then the web can establish an anonymous account for the user, to allow the user participates in the network activities in an anonymous identity. When the user takes some improper or illegal acts, the web can retrieve the previous authentication information, and disclose the identity of the user through the believable group, that is, the administrator of the corporation to which the user belongs.

The present invention has a strong university, and provides a uniform believable platform for anonymous registration, allows that various register service institutions to support an anonymous registration of a user on a believable platform.

Figure 2:
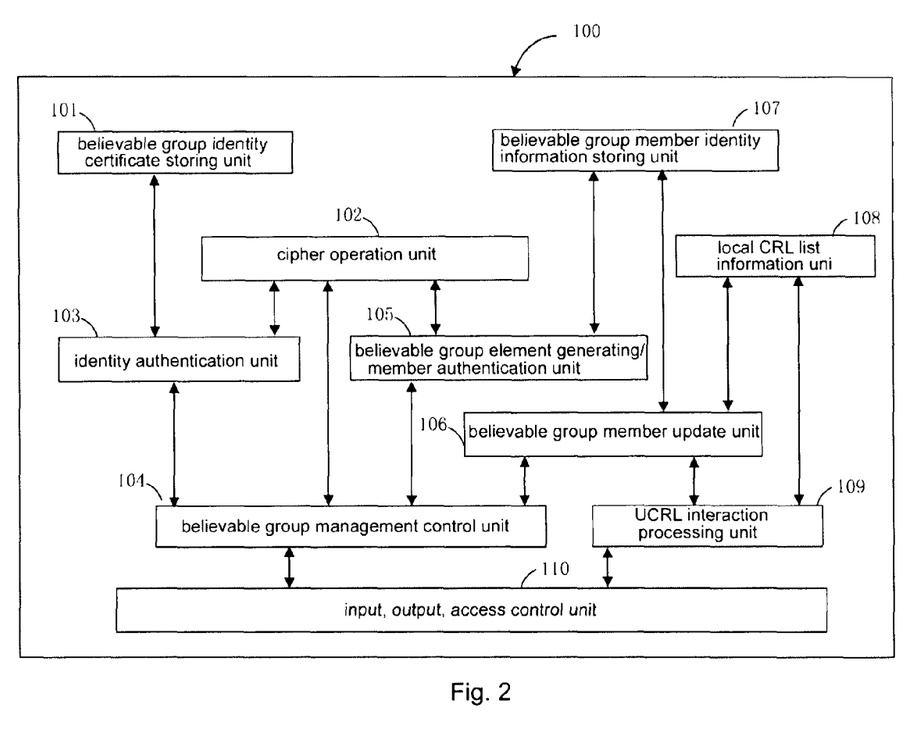
FIG. 2 is a diagram showing an internal structure of a believable group module.

Please refer to FIG. 2, which is a diagram of main structures of a believable group module.

The flow that a user applies for joining a believable group is as follows: the legality of the apply of the user is verified by an administrator of the group, and if the apply is accepted, then through the input of the key for the administrator and privacy information of the system, a user key for the user is generated by a cipher operation unit 102. The user can make use of the user key to perform signature operations in representative of the group.

Figure 6A:
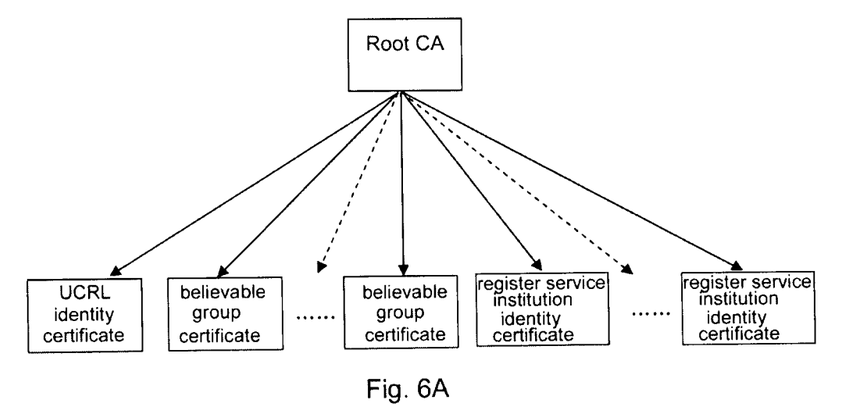
FIGS. 6A and 6B are diagrams of first level CA model supporting security of the present system structure.
Figure 6B:
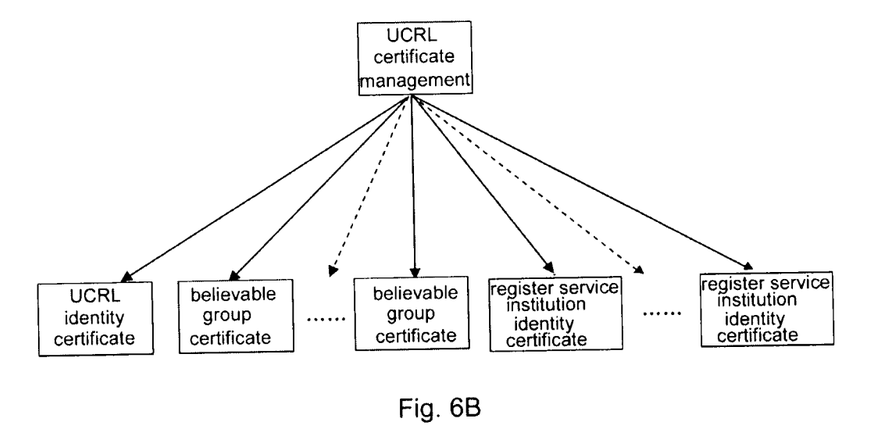

An identity authentication unit 103 performs identity authentication of each other based on the identity certificate of the believable group itself stored by a believable group identity certificate storing unit 101 mainly for all the modules interacting with a believable group module 100 such as various register service institutions 300, UCRL 200 and the like. For the identify, identity distribution issues are dealt by a certificate managing module such as that shown in FIGS. 6-A and 6-B, and the identity authentication unit 103 authenticates these identity certificates in reality applications. For the interaction is bi-directional, that is the module also need to use the certificate of its own to perform bi-direction authentication, so corresponding certificates needs to be provided to the identity authentication unit. Such authentication is for implementing a believable computing environment.

A believable group management control unit 104 is responsible for all the operations related to "identity", for example, when the believable group is communicating with a register service institution, the believable group management control unit 104 is responsible for receiving identity information (such as certificate, signature) of the register service institution, and forwards it to the identity authentication unit 103 to be authenticated, and the identity authentication unit 103 needs to feedback information on whether the identity authentication succeeds to the believable group management control unit 104, so that the believable group management control unit 104 can decide whether to establish a connection to perform interaction operations.

A cipher operation unit 102 is for, on a basis of an instruction from the identity authentication unit, the believable group management control unit or a believable group element generating/member authenticating unit, by use of a cryptography, performing encryption/decryption, signature, and signature authentication, and computing an integrity of message transmitted from a user entity, a uniform revocation list module or a register service institution. The cipher operation unit 102 comprises an cipher operation engine, such as Hash, block cipher computation, public key cipher computation. For example, the identity authentication unit 103 can call a public key algorithm to perform identity authentication between module, and the believable group element generating/member authenticating unit can call corresponding cipher algorithm to generate a member key for a user. The believable group element generating/member authentication unit 105 is for generating an element of a believable group, and for, when an identity of a certain member of a believable group is questioned by the register service institution or uniform revoked certificate list managing module, performing identity authentication of the questioned member of the believable group.

Of course, the cipher operation unit 102 and the believable group management control unit 104 can establish an direct association there between, for example, if communication data is transmitted in cipher, information needs to be decrypted, and be transferred to a processing unit for being processed.

When a new user applies for joining a believable group or true identity of a user is authenticated, the believable group management control unit 104 needs to interact with the believable group element generating/member authenticating unit 105. The believable group element generating/member authenticating unit 105 has two main functions. The first function is to generate a group element. The system calls this function when being initialized or updated, so as to generate security parameters related to the system, the security parameters including group public key and main key information. The information is subsequently used to generate member keys. Another group element to be generated is each member in the group which is an element of the group. The second function is to authenticate a member, that is, when a dispute related to identity occurs, the function is for confirming the true identity of a user based on the signature information of the user. The believable group further comprises a local CRL list information unit 108 for storing local CRL list information, so as to store revocation information related to the believable group. The believable group management control unit 104 is for scheduling and processing operations related to a member of a believable group. A believable group member identity information storing unit 107 is for storing identity information of all members joined into the believable group. A believable group member update unit 106 is for, on a basis of a processing result of cancellation of a member of a believable group, upgrade of a member key etc performed by the believable group management control unit 104, performing update operation for identity information of members of the believable group stored in the believable group member identity information storing unit 107. The local CRL list information unit 108 is for storing user information of canceled members of the believable group. The believable group member update unit 106 updates the user information of the canceled members of the believable group in the local CRL list information unit 108 according to the processing result of cancellation of the members of the believable group by the believable group management control unit 104. An access control unit 110 serves as an input/output interface with other modules. A believable group identity certificate storing unit 101 is for storing an identity certificate of the believable group itself.

Figure 3:
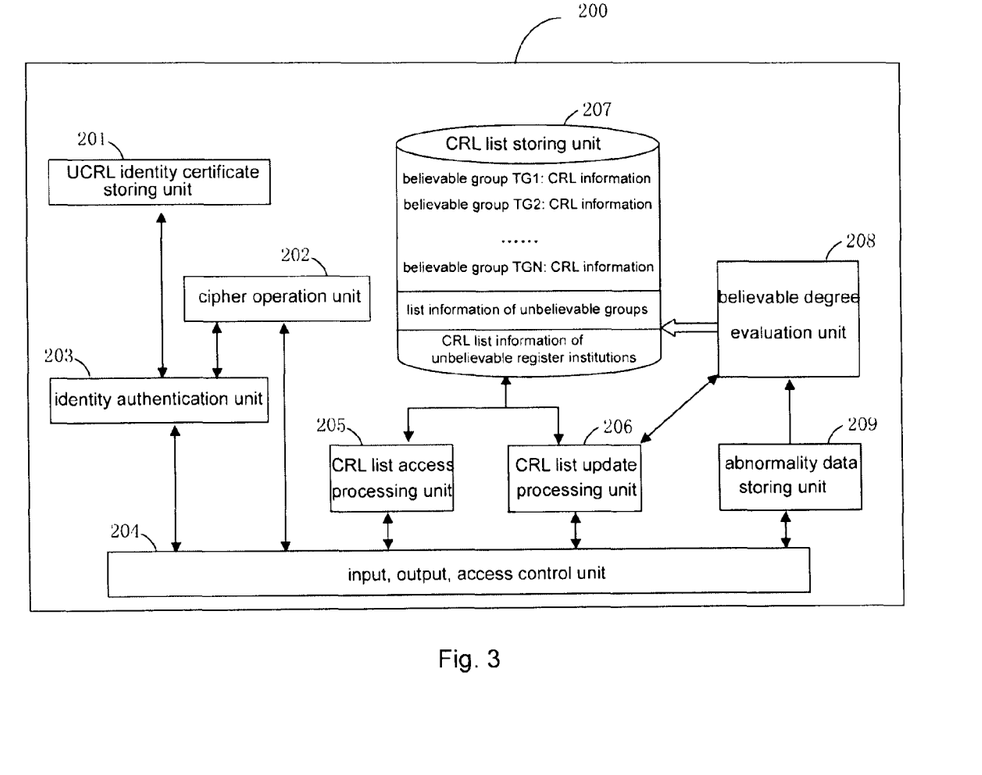
FIG. 3 is a diagram showing a structure of a uniform revocation list managing module UCRL.

A UCRL interaction processing unit 109 in each believable group, after the local CRL list information in the local CRL list information unit 108 was updated, interacts with the UCRL 200 through the access control unit, so as to update CRL information for the believable group in the UCRL in real time FIG. 3 is a diagram shows the structure of a uniform revocation list managing module UCRL.

A UCRL identity certificate storing unit 201 stores an identity certificate of the UCRL 200, to guarantee the truth of the identity of the uniform revocation list managing module when being interacting with various believable groups and register service institutions.

A CRL list storing unit 207 stores three kinds of information, including a CRL list of each believable group, a list of unbelievable groups, and a list of unbelievable register institutions.

An identity authentication unit 203, when interacting with the believable group module and the register service institution, performs identity authentication of each other, so as to verify reliable identities of both interacting sides based on the identity certificate of the UCRL stored in the UCRL identity certificate storing unit, through a cipher operation unit 202 which, on a basis of an instruction of the identity authentication unit and the access control unit, by use of a cryptography, performs encryption/decryption, signature, and signature authentication, and computes an integrity of message transmitted from a user entity, the believable group module or the register service institution.

A CRL list access processing unit 205 processes an access to the CRL information from the register service institution 300.

A CRL list update processing unit 206, in response to a request to update CRL list information from a UCRL interact processing unit in the believable module, performs update process with respect to the CRL list storing unit, so as to update the CRL list of a believable group stored in the CRL list storing unit, or for updating the CRL list information of a believable group when the believable group takes initiative to interact with the uniform revocation list managing module.

An abnormality data storing unit 209 stores abnormal information uploaded by a believable group or a register service institution. A believable degree evaluation unit 208 evaluates a believable degree of the believable group or the register service institution based on the abnormal information, and updates the list information of unbelievable groups in the CRL list storing unit and the list information of unbelievable register service institutions according the evaluated believable degree.

An access control unit 204 serves as an input/output interface with other apparatuses in the believable anonymous register system. The UCRL identity certificate storing unit 201 stores an identity certificate of the UCRL. The CRL list storing unit 207 stores a CRL list of each believable group, a list of unbelievable groups, a list of unbelievable register service institutions. A CRL list access processing unit 205 is for processing, via the access control unit 204, an access to the CRL list storing unit 207 from the register service institution 300, so as to access a CRL list information in the CRL list storing unit 207.

A cipher operation unit 202, on a basis of an instruction of the identity authentication unit and the access control unit, by use of a cryptography, performs encryption/decryption, signature, and signature authentication, and computing an integrity of message transmitted from a user entity, the believable group module or the register service institution.

Figure 4:
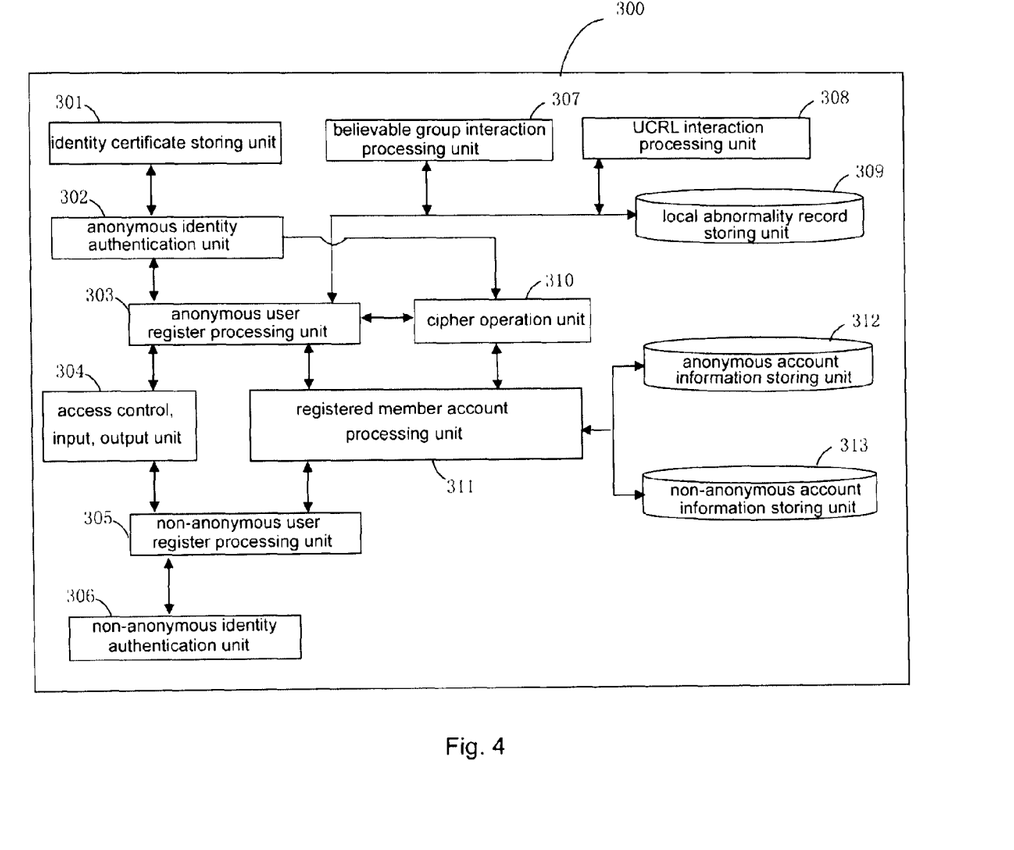
FIG. 4 is a diagram showing a structure of a register service institution supporting anonymous registration.

FIG. 4 is a diagram shows a structure of a register service institution supporting an anonymous register. Each register service institution comprises:

An access control unit 304 serves as an input/output interface through which the register service institution interacts with other modules. An identity certificate storing unit 301 is for storing an identity certificate of the register service institution, so as to guarantee the truth of the identity when being interacting with the UCRL or various believable groups. An anonymous identity authentication unit 302 performs authentication of an anonymous identity of a user when the user selects to register in anonymous form, the authentication comprising the verifying of the believable degree of the group the user belongs to and the verifying of the group signature information provided by the user. The authentication procedure performed by anonymous identity authentication unit 302 comprises verifying the believable degree of the group the user belongs to and verifying the group signature information provided by the user. The cipher operation unit 310 supports various cryptography as needed, including Hash, symmetric cryptography, and public key cryptography, to achieve the objects of encryption/decryption, signature, signature authentication, the computing of integrity of message. An anonymous user register processing unit 303 processes various background processes of anonymous register of a user. A registered member account processing unit 311 is the core unit of the whole register service institution, and is responsible for implementing the background process of either non-anonymous register or anonymous register, and is responsible for generating account information for all registered users. An anonymous account information storing unit 312 stores an account of an anonymous user and other related information.

A non-anonymous user register processing unit 305 implements related processing while performing non-anonymous register of a user. A non-anonymous identity authentication unit 306 implements identity authentication of a non-anonymous user, such as the confirming of the truth of identity code. A non-anonymous account information storing unit 313 stores an account of a non-anonymous user and other related information.

A believable group interaction processing unit 307 applies a believable group for canceling a register right of a user, or canceling anonymity of a user.

When an anonymous register application is dealt with, it is necessary for the UCRL to confirm that the applicant of the anonymous register is not in a revocation register list of the UCRL, and a UCRL interaction processing unit 308 is responsible for interacting with a UCRL, and for updating the UCRL with information in a local abnormality record storing unit.

The local abnormality record storing unit 309 buffers a register application for which an anonymous register fails and corresponding interaction information record and account which is cancelled by the register service institution due to improper action and corresponding user information record.

And the UCRL interaction processing unit 308 also can update information stored in the local abnormality record storing unit to the UCRL.

A cipher operation unit 310, on a basis of an instruction of the anonymous user register processing unit, the anonymous identity authentication unit, and the registered member account processing unit, by use of a cryptography, performs encryption/decryption, signature, and signature authentication, and computes an integrity of message transmitted from a user entity, a uniform certificate revocation list module, or a believable group module. The cipher operation unit supports various cryptography as needed, including Hash, symmetric cryptography, and public key cryptography.

Figure 5:
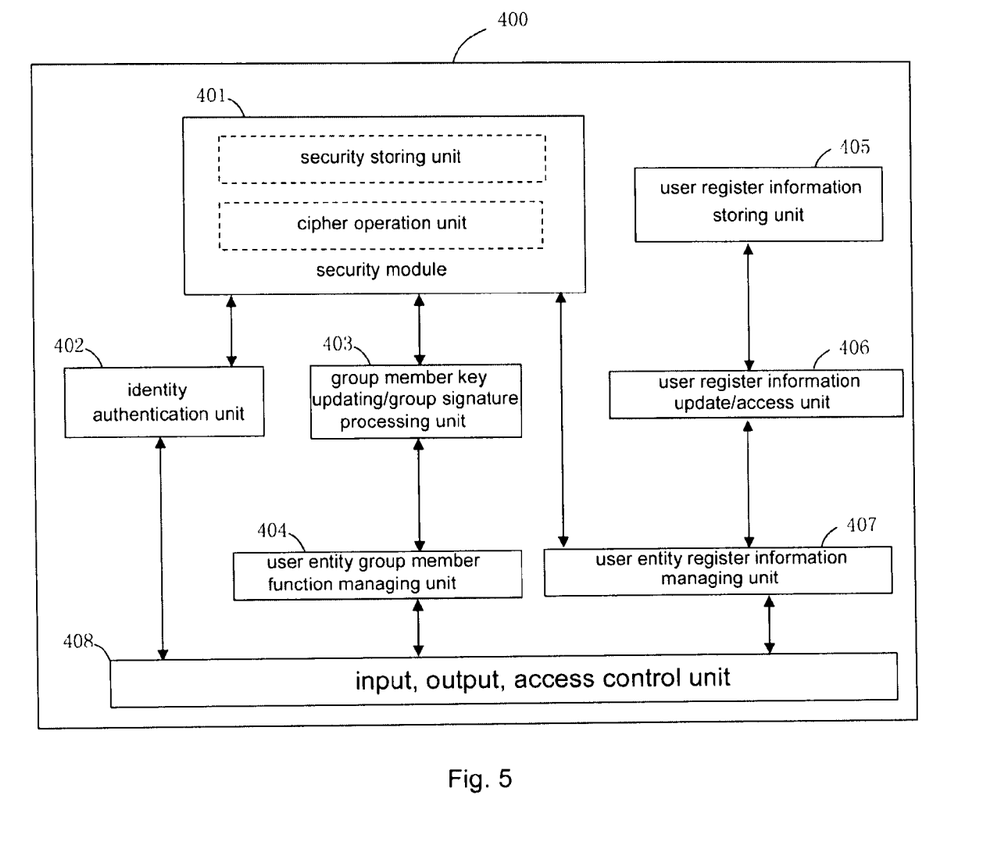
FIG. 5 is a diagram showing a structure of a user entity supporting anonymous registration.

FIG. 5 is a diagram shows a structure of a user entity supporting anonymous register.

A user entity group member function managing unit 404 is for responsible for processing operations related to a believable group, comprising operations of applying for joining a group, requesting for obtaining a member identify and storing a member key, and updating a member key. The member key of user needs to be stored in a separate secure storage area.

A user entity register information managing unit 407 is responsible for processing operations related to an applied register service institution for example when applying for one or more anonymous register identities and updating of register information. The register information record of a user will be stored in a storage area for user register information.

A security module 401 comprises the two parts of security storing unit and cipher operation unit. The security storing unit refers to a tamper-proofing physical storage area, and data stored in the area can be operated only with specific update logic and access control, and secrecy data such as group member key is stored therein. The cipher operation unit supports basic operations such as Hash, symmetric encryption/decryption, and asymmetric encryption/decryption, and also supports specific signature/authentication algorithm. The security module can be TPM (Believable Platform Module) or USB-key, Smartcard and the like in hardware, and also can be soft function module with the same security capability.

A group member key updating/group signature processing unit 403 is used in the following circumstance: when a user needs to join one or more believable groups, the member key of the user himself or herself needs to participate in the signature operation with respect to challenging information sent from the register service institution, and further each believable group may perform key updates at any time. These operations are to be implemented through calling data and algorithm of the security module.

The user entity performs, through an identity authentication unit 402, authentication of identity information of a believable group or an applied register service institution, and confirms the believableness and validity of the identity so as to perform related operations.

A user register information update/access unit 406 is responsible for interacting with the user register information storing unit and the user entity register information managing unit, to implement the function of storing and accessing.

A user register information storing unit 405 is responsible for storing information related to an applied register service institution with which the user registered, such as an anonymous account and the like.

FIGS. 6A and 6B are diagrams show a first level CA model supporting security of the present system structure. A believable group and a register service institution in an anonymous believable register system guarantee their identity reliability by identity certificates and related signature algorithm. The management of identity certificates is implemented based on the CA model of PKI, that is, a certificate center issues certificates of a believable group and a register service institution, a minimal implementing model is the first level CA model, that is, the Root CA issues directly. Of course, FIG. 6B also can be referred to when the system is implemented, wherein a UCRL is responsible for the issuing of identity certificates. If a complicate management system is to be built, a multi-level CA model also can be adopted.

Figure 7:
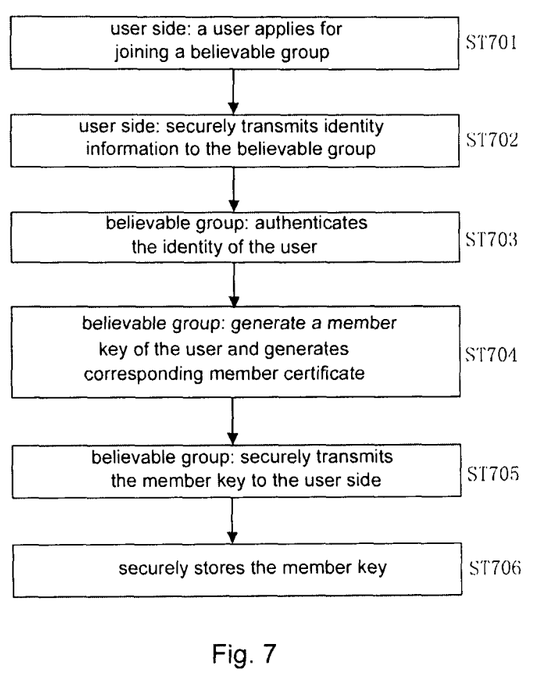
FIG. 7 is a processing flowchart for a user to join a believable group according to an apply example of the present invention.

FIG. 7 is a processing flowchart for a user to join a believable group according to an apply example of the present invention.

Referring to FIG. 7, in step ST701, a user applies for joining a believable group, and the believable group requires the user to provide identity information according to its own management scheme. In step ST702, the user securely transmits his or her own identity information to the believable group through the cooperation of the security module 401, the group member key updating/group signature processing unit 403, user entity group member function managing unit 404, and I/O access control unit 404. Subsequently, in step ST703, the believable group authenticates the identity of the applicant through the cipher operation unit 102, the believable group management control unit 104, the storage unit 108 and access control unit 110. And if necessary, the believable group can communicate with the UCRL through the UCRL interaction processing unit 109, to determine whether the applicant is in the CRL list of the believable group. If the authentication fails, the user is denied for joining in the believable group. If the authentication succeeds, the procedure goes to step ST704. In step ST704, the believable group encrypts the new generated member certificate or transmits the new generated member certificate to the user side through a secured channel. In step ST705, the user side authenticates the member certificate transmitted from the believable group and save it in the security module 401.

Figure 8:
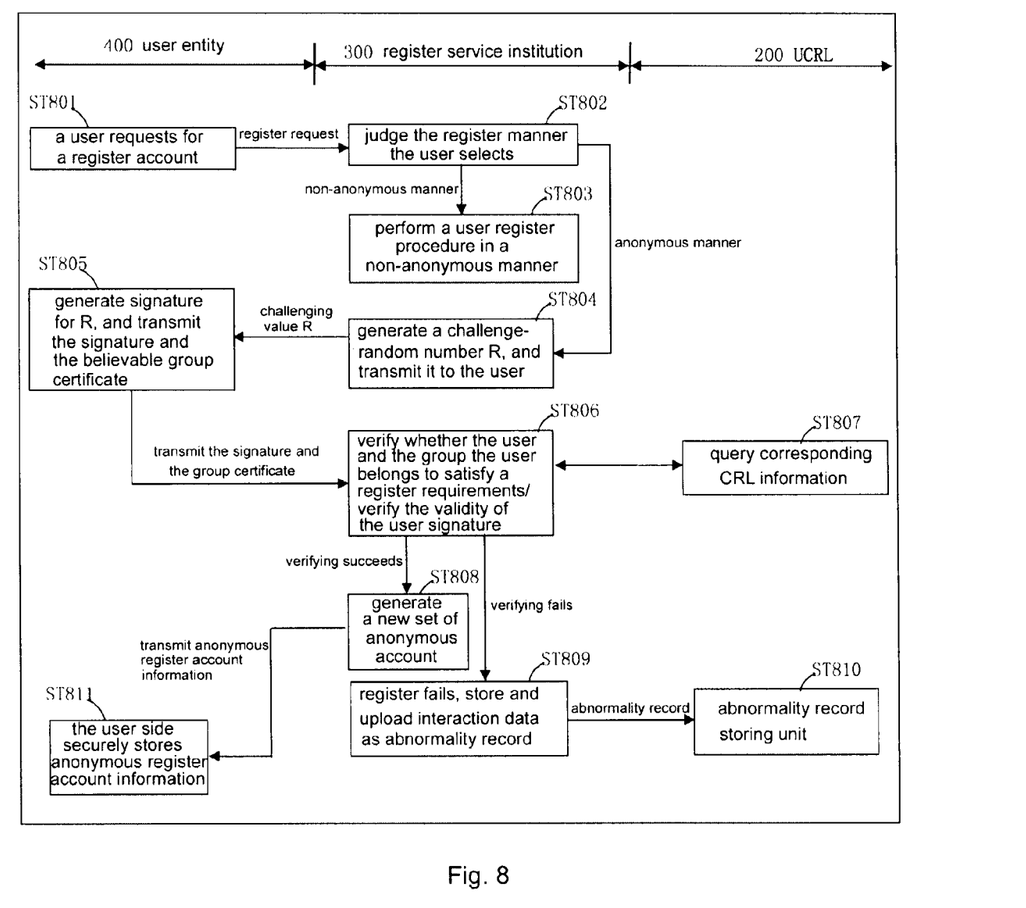
FIG. 8 is a processing flowchart for a user to register with a register service institution in a specific apply field according to an apply example of the present invention.

FIG. 8 is a processing flowchart for a user to register with a register service institution in a specific apply field according to an apply example of the present invention.

Referring to FIG. 8, in step ST801, a user entity 400 connects to a register service institution 300 in a specific apply field, and requests for a register account. In step ST802, the access control unit 304 judges the manner of the user register request, and if it is a non-anonymous register, then the procedure goes to step ST803, and if it is an anonymous register, then the procedure goes to step ST804.

In step ST803, the non-anonymous user register processing unit 305 implements the register interaction with the user, such as, requiring the user to fill in identity information, and the non-anonymous identity authentication unit 306 performs authentication on the user filled information, and finally the registered member account processing unit implements the post process to generate user account information and store the user information and user registered account information into a non-anonymous account information storing unit 313, thus the register is completed.

In step ST804, the anonymous user register processing unit 303 calls the cipher operation function to generate a secure random number R, signs the R, and uses it along with a certificate as a challenging value to demand the user entity to perform group signature thereon.

In step 805, the user entity register information managing unit 407 calls the identity authentication unit 402 of the user entity to verify the validity of the challenging value R of the register service institution. If it is valid, then the user entity register information managing unit 407 informs the group member key updating/group signature processing unit 403 to call the security module 401 to securely sign on the R value, and securely transmits the signed value and the certificate of the believable group to the register service institution 300 via the access control unit 408.

In step ST806, the register service institution verify whether the group the user belongs to satisfies a register requirements, and whether the user has already been in the CRL of the group. To do this, turn to UCRL 200 for testifying. If the testifying shows that the group the users belongs to stratifies the register requirements and the user has already been in the CRL of the group, then it is still necessary to verify the validity of the signature itself to prevent a forged signature by a third party. If all the verifying pass, then the procedure goes to step ST808, else the procedure goes to step ST809, and at the same time in step ST807, the register service institution 300 informs the user entity 100 that the believable group the user belongs to does not satisfy the requirements.

In step ST808, the register service institution generates a new set of anonymous account, and the anonymous account along with the signature information of the user and group certificate information are recorded in the anonymous account information storing unit 312, and simultaneously the new generated anonymous account is transferred to the user side in a secure way.

In step ST809, the register service institution buffers key data or important data in the interaction of a failed register as abnormity record in the local abnormality record storing unit, and upload it to the UCRL 200.

In step ST810, the UCRL 200 receives the abnormity record from the register service institution 300, and judges the validity of the abnormity record. If the abnormity record is valid, then store it in the abnormality record storing unit 209 of its own, and if it is not valid, then discard it.

In step ST811, the user side receives the anonymous register account information, and stores it in the security module of its own, and then the register is completed.

Figure 9:
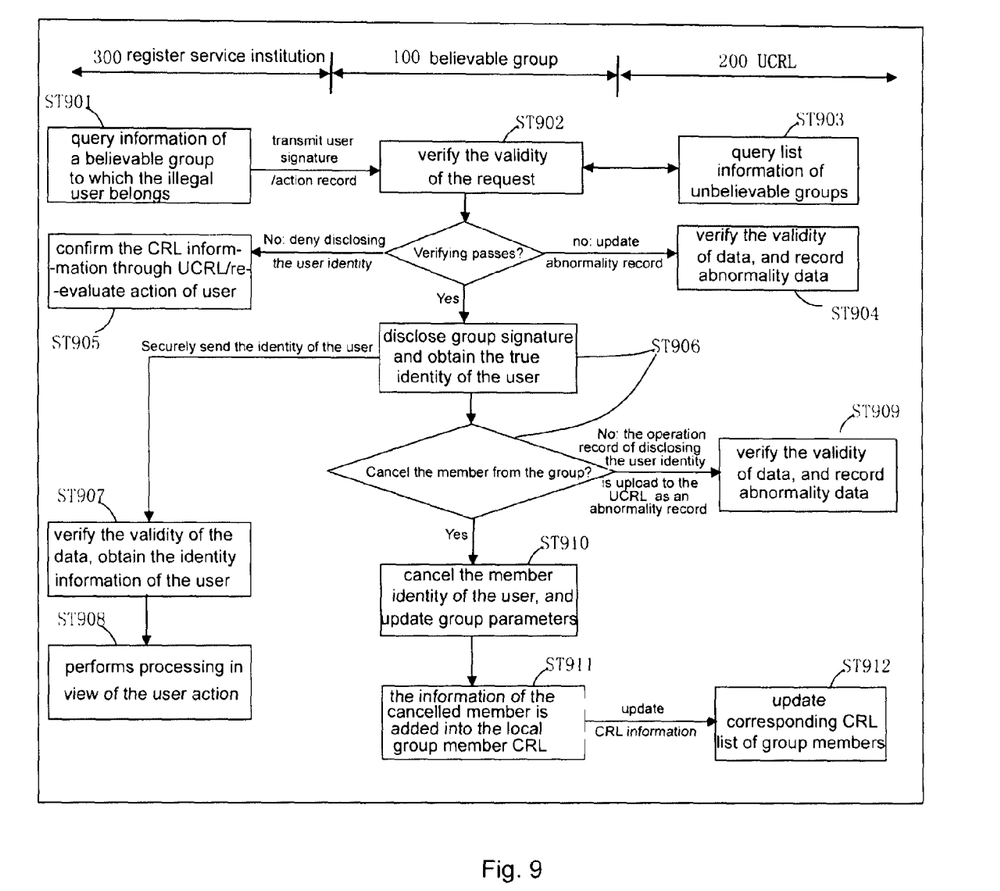
FIG. 9 is a processing flowchart for a register service institution to request a believable group to cancel an anonymous identity of a certain user according to an apply example of the present invention.

FIG. 9 is a processing flowchart for a register service institution to request a believable group to cancel an anonymous identity of a certain user according to an example of the present invention.

Referring to FIG. 9, in step ST901, the register service institution determines the signature and believable group information when the anonymous user registers through the anonymous account information storing unit 312, and transmits the improper action record of the user along with the signature information to the believable group the user belongs to.

In step 902, the believable group 100 queries the list information of unbelievable register service institutions through the UCRL 200, and authenticates information such as the certificate of the register service institution, and verifies the validity of the request transmitted from the believable institution. If all the verifying passes, then the procedure goes to step ST906, and if the verifying fails, then step ST904 and step ST905 are executed.

In step ST903, in response to the query request from the believable group 100, UCRL 200 firstly verifies the validity of interaction data and then returns corresponding records.

In step ST904, UCRL 200 receives abnormality data sent from the believable group 100, the abnormality data refer to information of a institution service institution which does not pass the verifying. UCRL 200 evaluates the believable degree of the register service institution based on the information.

In step ST905, the register service institution 300 receives rejection information from the believable group, and determines whether the believable group is in the CRL, and if both identities are worth of being believable, then the register service institution 300 will reevaluate the action of the user.

In step ST906, the believable group 100 makes disclosure, that is, discloses the true identity of the user according to the signature information when the user registers by means of group signature, and securely transmits related information to the register service institution 300 which makes request in step ST901. Meanwhile, in step ST906, the believable group needs to consider whether to cancel the identity as a member of the believable group for the user. If it is considered unnecessary for canceling, then the operation record of disclosing the user identity is upload to the UCRL as an abnormality record. At the same time, in step ST909, UCRL verifies the validity of the abnormality record and stores it. The abnormality herein refers to information of the register service institution related to the disclosure. If it is considered necessary to cancel, then the procedure goes to step ST910. In step ST910, the believable group cancels the member identity of the user, and updates group parameters, and updates related information for entities associated therewith. In step ST911, the information of the cancelled member is added into the local group member CRL, and is uploaded to the UCRL 200. In step ST912, UCRL 200 verifies the validity of the information and updates the CRL storing unit of its own.

In step ST907, the register service institution 300 verifies the validity of the data, obtains the true identity information of the user. In step ST908, the register institution 300 performs corresponding processing according to the improper action of the user.

Figure 10:
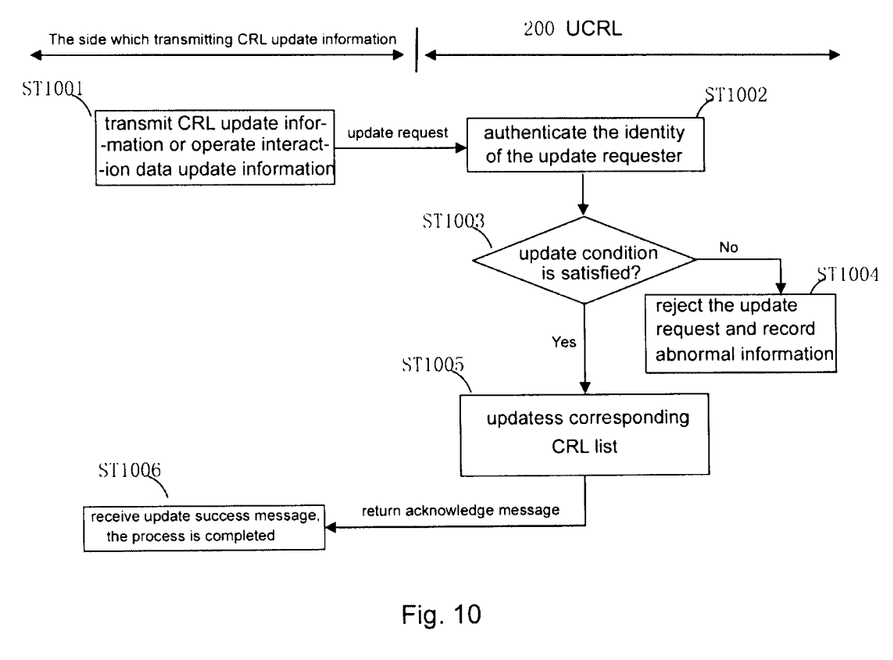
FIG. 10 is a processing flowchart for an external entity to update CRL information with UCRL according to an apply example of the present invention.

FIG. 10 is a processing flowchart when an external entity requests the UCRL 200 to update CRL information and requests to upload or update the abnormality record according to an example of the present invention.

Referring to FIG. 10, the external entity can be the believable group 100 or the register service institution 300. In step ST1001, the external entity (a believable group of a register service institution), after signing generated update information and message abstract of the update request, transmits it to the UCRL 2000. In step ST1002, the I/O access control unit 203 of the UCRL 200 after receiving the external query request, calls the identity authentication unit 203 to authenticate the identity of the message sender. And if the identity of the message sender is not valid, then the request is rejected. If the validity of the applicant is confirmed, then in step ST1003, UCRL 200 judges whether update condition is satisfied, that is whether it's a valid update apply. If it is not a valid update apply, then the procedure goes to step ST1004, and in step ST1004, the update request is rejected this time, and an abnormality record is made. If it is a valid update apply, then the procedure goes to step ST1005, and in step ST1005, UCRL 200 updates corresponding CRL information in the CRL list storing unit 207, and returns acknowledge message to the external entity. And finally in step ST1006, the external entity receives update success message, and the process is completed.

It should be understood by those skilled in the art that various modifications, combinations, sub-combinations and alternations may occur depending on design requirements and other factors insofar as there are within the scope of the appended claims or the equivalents thereof.

What is claimed is:

1. A uniform certificate revocation list (UCRL) managing apparatus for managing canceled register information of a plurality of register service institutions and a plurality of believable groups in a believable anonymous register system, the UCRL managing apparatus comprising:
  at least one hardware processor, wherein the at least one hardware processor is configured to:
    store a certificate revocation list (CRL) of each believable group in the plurality of believable groups, a list of unbelievable groups, and a list of unbelievable register service institutions, wherein the CRL of each believable group comprises canceled member information associated with at least one user of the believable group;
    obtain first abnormal data from a first believable group of the plurality of believable groups and second abnormal data from a first register service institution of the plurality of register service institutions, wherein the first abnormal data is obtained in response to the first believable group failing to verify one of the plurality of register service institutions and the second abnormal data is obtained in response to the first register service institution failing to verify one user associated with one of the plurality of believable groups;

evaluate a believable degree of the one register service institution based on the first abnormal data and a believable degree of the one believable group based on the second abnormal data; and update the list of unbelievable groups and the list of unbelievable register service institutions, respectively, based on the evaluated believable degree of the one register service institution and the one believable group;

wherein each believable group of the plurality of believable groups comprises a believable group member associated with a user, and each believable group is enabled to establish a key for performing signature operations representative of the believable group and a signature is used to determine the believable group member;

wherein each register service institution of the plurality of register service institutions is enabled to acknowledge a legal entity of a user associated with one of the plurality of believable groups through an authentication based upon a signature and is further enabled to establish an anonymous account for the user.

2. The UCRL managing apparatus as claimed in claim 1, wherein the at least one hardware processor is further configured to:

interface with other apparatuses in the believable anonymous register system;

store an identity certificate of the UCRL;

authenticate at least one of the plurality of register service institutions based on the identity certificate of the UCRL;

process an access request to the CRL from the at least one of the plurality of register service institutions; and perform encryption/decryption, the signature, and signature authentication, and compute an integrity value of message transmitted from a user entity, or at least one of the plurality of register service institutions.

3. The UCRL managing apparatus as claimed in claim 2, wherein the at least one hardware processor is further configured to:

in response to a request to update CRL information, perform an update process so as to update the CRL of a believable group.

4. A believable anonymous register system comprising:

a believable group module comprising at least one processor configured to:

manage at least one believable group of a plurality of believable groups, wherein each believable group of the plurality of believable groups comprises a believable group member associated with a user, and each believable group is enabled to establish a key for performing signature operations representative of the believable group and a signature is used to determine the believable group member;

a uniform certificate revocation list (UCRL) managing device comprising at least one processor configured to:

store a certificate revocation list (CRL) of each believable group in the plurality of believable groups, a list of unbelievable groups, and a list of unbelievable register service institutions, wherein the CRL of each believable group comprises canceled member information associated with at least one user of the believable group;

obtain first abnormal data from a first believable group of the plurality of believable groups and second abnormal data from a first register service institution of a plurality of register service institutions, wherein the first abnormal data is obtained in response to the first believable group failing to verify one of the plurality of register service institutions and the second abnormal data is obtained in response to the first register service institution failing to verify one user associated with one of the plurality of believable groups;

evaluate a believable degree of the one register service institution based on the first abnormal data and a believable degree of the one believable group based on the second abnormal data; and update the list of unbelievable groups and the list of unbelievable register service institutions, respectively, based on the evaluated believable degree of the one register service institution and the one believable group;

a register service institution of the plurality of register service institutions comprising at least one processor configured to:

perform a register process to acknowledge a legal entity of a user through an authentication based on a signature associated with the user, and establish an anonymous account for the user; and a user entity comprising at least one processor configured to: perform an anonymous registration for the user corresponding to the believable group member, and support a user-side security module of an signature algorithm required by the believable group.

5. The believable anonymous register system as claimed in claim 4, wherein the plurality of register service institutions further comprise different application environments.

6. The believable anonymous register system as claimed in claim 4, wherein the believable group module and each register service institution of the plurality of register service institutions assure identity reliability by respective identity certificates and corresponding signature algorithms.

7. The believable anonymous register system as claimed in claim 4, wherein the at least one processor of the believable group module is further configured to:

interface with other modules;

schedule and process operations related to the member of a believable group;

store an identity certificate of the believable group;

perform identity authentication of the UCRL managing device based on the identity certificate of the believable group stored in a believable group identity certificate storing unit;

generate an element of a believable group, and when an identity of a certain believable group member is questioned by the register service institution or UCRL managing device, and perform identity authentication of the questioned member of the believable group;

store identity information of all members joined into the believable group;

perform encryption/decryption, the signature, and signature authentication; and compute an integrity value of message transmitting from the user entity, the UCRL managing device or the register service institution.

8. The believable anonymous register system as claimed in claim 7, wherein the at least one processor of the believable group module is further configured to:

perform, in response to a cancellation of a member of a believable group, an update operation for identity information of members of the believable group.

9. The believable anonymous register system as claimed in claim 8, wherein the at least one processor of the believable group module is further configured to:

update the identity information of the canceled member of the believable group in a local CRL response to cancellation of the member of the believable group.

10. The believable anonymous register system as claimed in claim 9, wherein the at least one processor of the believable group module is further configured to:

in response to updating the identity information in the local CRL, interact with the UCRL managing device through an access control unit to update CRL information for the believable group stored in the UCRL managing device in real time.

11. The believable anonymous register system as claimed in claim 4, wherein the at least one processor of the user entity is further configured to:

interface with other modules;

perform authentication of identity information of a believable group or a register service institution in order to confirm the validity of the identity;

process operations related to a believable group, the operations comprising applying for joining a group, requesting for obtaining a member identity, storing a member key, and updating a member key;

process operations related to a register service institution when applying for one or more anonymous register identities and updating of register information;

store, in a physical storage area prevented from being tampered, secrecy data including a group member key, said secrecy data being used based on specific update logic and access control, and support basic operations including at least one of hashing, symmetric encryption/decryption, asymmetric encryption/decryption, and a specific signature/authentication algorithm;

request said secrecy data and said signature/authentication algorithm, and perform a signature operation with respect to challenging information sent from the register service institution by use of a member key of the user; and store information related to a register service institution with which the user registered with.

* * * * *